United States Patent [19]

Ikeda et al.

[11] Patent Number: 5,393,394
[45] Date of Patent: Feb. 28, 1995

[54] METHOD AND APPARATUS FOR DECOMPOSING ORGANIC HALOGEN-CONTAINING COMPOUND

[75] Inventors: Michio Ikeda; Miho Suzuki; Norio Takeyama; Terunobu Hayata, all of Kanagawa, Japan

[73] Assignee: Kabushiki Kaisha Toshiba, Kawasaki, Japan

[21] Appl. No.: 105,625

[22] Filed: Aug. 13, 1993

[30] Foreign Application Priority Data

Aug. 18, 1992 [JP] Japan .................................. 4-219115
Apr. 2, 1993 [JP] Japan .................................. 5-076760

[51] Int. Cl.$^6$ ............................................. C07B 63/00
[52] U.S. Cl. ............................ 204/158.20; 204/157.6; 588/206; 588/207; 588/210; 588/212; 588/227; 210/748
[58] Field of Search ................. 204/157.6, 158.20; 588/206, 207, 210, 212, 227; 210/748

[56] References Cited

U.S. PATENT DOCUMENTS 4,144,152 3/1979 Kitchens ........................... 588/210

FOREIGN PATENT DOCUMENTS 49-045027 4/1974 Japan .
62-191025 8/1987 Japan .
4-235930 8/1992 Japan .

*Primary Examiner*—John Niebling
*Assistant Examiner*—C. Delacroix-Muirheid
*Attorney, Agent, or Firm*—Foley & Lardner

[57] ABSTRACT

Disclosed is a method and an apparatus for decomposing organic halogen-containing compounds by using ultraviolet radiation. In the decomposition method, the organic halogen-containing compound is dissolved in a solvent to form a liquid, and the liquid is exposed to ultraviolet radiation in the substantial absence of alkaline material. Then, the liquid is treated with an alkaline material. The decomposition apparatus for the organic halogen-containing compound comprises: preparation means for preparing a liquid containing the organic halogen-containing compound and a solvent in which the organic halogen-containing compound can be dissolved; exposure means for exposing the liquid to light radiation of an effective wavelength for initiating decomposition of the organic halogen-containing compound in the substantial absence of an alkaline material; and treatment means for treating the liquid with an alkaline material.

19 Claims, 5 Drawing Sheets

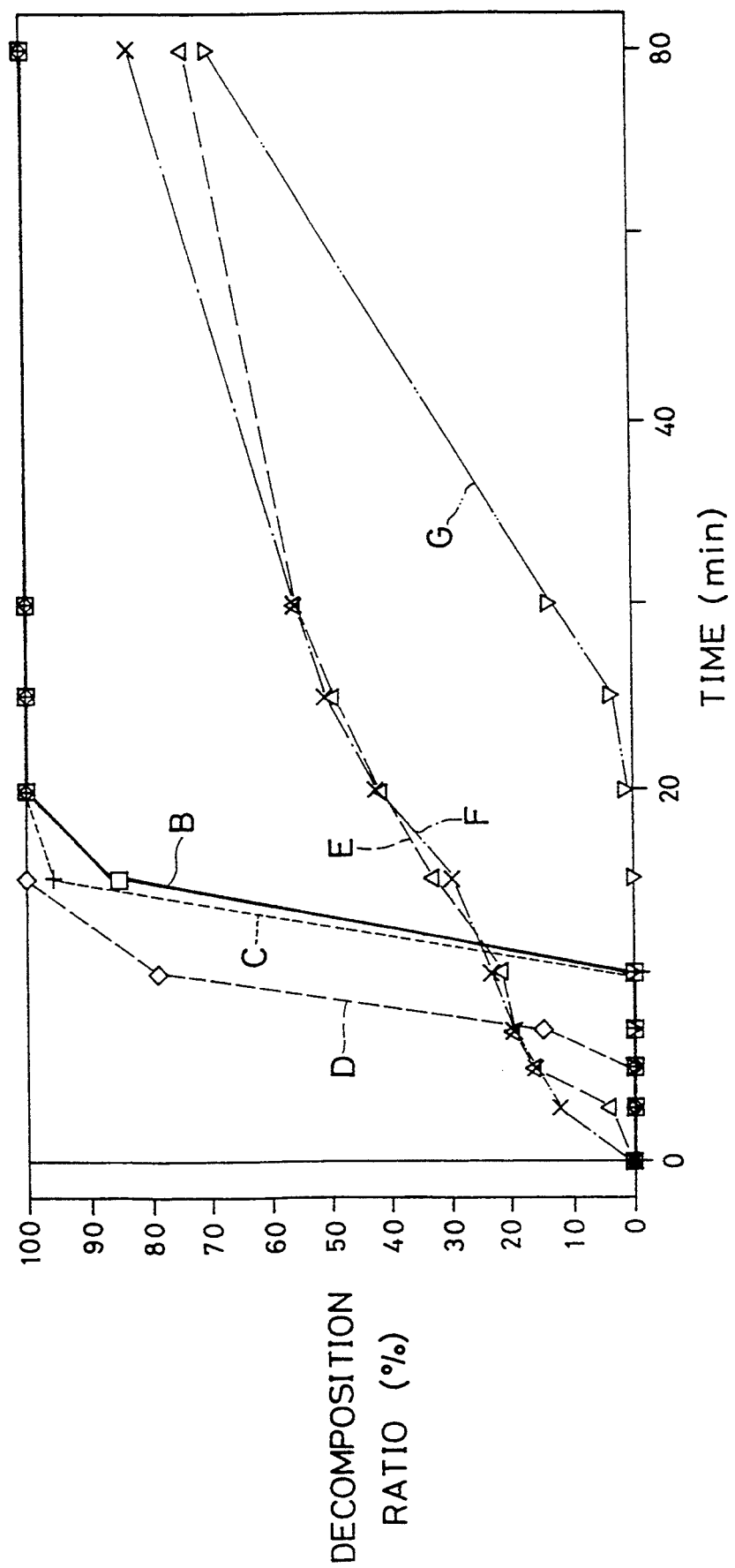

METHOD AND APPARATUS FOR DECOMPOSING ORGANIC HALOGEN-CONTAINING COMPOUND

BACKGROUND OF THE INVENTION

1. Field of the Invention

The present invention relates to a method and an apparatus for decomposing an organic halogen-containing compound, and in particular to a technique for efficiently decomposing an organic halogen-containing compound by ultraviolet ray irradiation.

2. Description of the Prior Art

Halogen-containing organic compounds such as trichloroethylene, polychlorobiphenyl (PCB), various Freons ("Freon" is a trademark for certain fluorocarbon compounds manufactured by Du Pont) and the like have been widely used in the field of chemical industry and also in other industrial fields. Of these organic compounds, chlorine-containing compounds, e.g. trichloroethylene, PCB, etc. have been already confirmed as being poisonous to humans. Fluorine-containing compounds have not as yet been found to be toxic to humans. However, recent warnings have been issued that the fluorine-containing compounds seem to destroy the ozonosphere to adversely affect the global atmosphere. In such circumstances, the public interest has been increasingly attracted toward methods of decomposing halogen-containing compounds, and various methods have been researched in order to lessen the harm from such compounds.

Specifically, techniques such as a catalytic method, an ultraviolet irradiation method, a sodium decomposition method, etc. are now under development.

In the catalytic method, decomposition of the organic halogen-containing compound is carried out with a catalyst in a liquid phase by consuming oxygen contained in the liquid phase. This method is easily practiced and does not need much driving energy, therefore it is economically advantageous. However, the decomposition efficiency is rather low due to low concentration of the oxygen in the liquid phase. Moreover, halide products such as hydrogen fluoride, hydrogen chloride, etc. which are generated by the decomposition reaction cause a problem by rapidly reducing the activity of the catalyst.

In the ultraviolet radiation method, an organic halogen-containing compound in the gaseous state is decomposed by irradiating with ultraviolet rays. In this method, the halide products produced in the decomposition reaction hinder further process of the decomposition reaction. As a result, it becomes difficult to complete the decomposition reaction of the organic halogen-containing compounds by ultraviolet irradiation only, and the decomposition efficiency remains low. Moreover, this method involves the risk of damaging the apparatus with corrosive halide gases at a higher frequency than in conventional methods. In addition, this method tends to require large-scale apparatus. Therefore, this method is disadvantageous, unless the above-described problem with decomposition efficiency is solved.

In the sodium decomposition method, the organic halogen-containing compounds are decomposed with sodium at a high decomposition efficiency. However, since this method consumes a large amount of the sodium material, it is economically disadvantageous. Moreover, in the apparatus for carrying out this method, it is necessary to provide much equipment for ensuring operational safety during handling of the sodium material. As a result, this apparatus requires a large space for installation.

Of the above-described decomposition methods, the ultraviolet radiation method has been recently improved and suggested for decomposition of chlorine-containing compounds. In this improved method, for increasing the velocity of decomposition reaction, the chlorine-containing compounds are dissolved in an alcohol solvent which contains an alkaline metal material, and ultraviolet rays are used to irradiate that solution. In this reaction system, the chloride compound, i.e. hydrogen chloride produced by the decomposition reaction, forms a salt with the alkaline metal in the solution, and the salt is precipitated and removed from the solution. Accordingly, hindrance of the decomposition reaction by the decomposed product can be prevented.

However, in the above-described ultraviolet irradiation method, the alcohol molecules of the solvent may be transferred to the corresponding aldehyde or ketone form in the reaction system by ultraviolet radiation, and the aldehyde, ketone and the like are polymerized in the presence of the alkaline material in accordance with the aldol condensation reaction. This reaction badly affects the reaction system to make it difficult to repeat the decomposition operation. Therefore, this method is poor in practice.

As described above, each of the conventional decomposition methods has been associated with problems hindering the actual use, and no technique for actual use is as yet known.

SUMMARY OF THE INVENTION

It is therefore an object of the present invention to provide a method of decomposing an organic halogen-containing compound with ultraviolet radiation in which the decomposition efficiency can be highly improved and which is suitable for use in practice.

It is another object of the present invention to provide an apparatus for decomposing an organic halogen-containing compound with ultraviolet radiation in which the decomposition operation can be carried out economically.

The foregoing object is accomplished in one embodiment of the present invention by providing a process for decomposing an organic halogen-containing compound, comprising the steps of: exposing a liquid containing the organic halogen-containing compound and a solvent in which the organic halogen-containing compound can be dissolved, to ultraviolet radiation in the substantial absence of alkaline material; and treating the liquid with an alkaline material.

The object is accomplished in another embodiment of the present invention by providing a process for decomposing an organic halogen-containing compound, comprising the steps of: exposing a liquid containing the organic halogen-containing compound and isopropanol to ultraviolet radiation in the substantial absence of alkaline material; treating the liquid with an alkaline material; and treating the liquid with an aqueous liquid.

The object is accomplished in further embodiment of the present invention by providing a process for decomposing an organic halogen-containing compound, comprising the steps of: exposing a liquid containing the organic halogen-containing compound, a solvent dissolvable the organic halogen-containing compound and a sensitizer, to ultraviolet radiation in the substantial absence of alkaline material; and treating the liquid with an alkaline material.

The object is accomplished in further embodiment of the present invention by providing a process for decomposing an organic halogen-containing compound, comprising the steps of: exposing a liquid containing the organic halogen-containing compound and a solvent in which the organic halogen-containing compound can be dissolved, to ultraviolet radiation in the substantial absence of alkaline material; and treating the liquid with an alcoholate compound.

The object is accomplished in further embodiment of the present invention by providing a process for decomposing an organic halogen-containing compound, comprising the steps of: preparing a liquid containing the organic halogen-containing compound and a solvent in which the organic halogen-containing compound can be dissolved; exposing the liquid to light radiation of an effective wavelength for initiating decomposition of the organic halogen-containing compound in the substantial absence of an alkaline material; and treating the liquid with an alkaline material.

Moreover, the foregoing object is accomplished in the present invention by providing an apparatus for decomposing an organic halogen-containing compound, comprising: preparation means for preparing a liquid containing the organic halogen-containing compound and a solvent in which the organic halogen-containing compound can be dissolved; exposure means for exposing the liquid to light radiation of an effective wavelength for initiating decomposition of the organic halogen-containing compound in the substantial absence of an alkaline material; and treatment means for treating the liquid with an alkaline material.

According to the present invention, the performance of the decomposition of the halogen-containing compound can be improved, and the decomposition operation can be repeated, while the used solvent is efficiently recovered and recycled. The decomposition efficiency can be maintained at a high level during several repetitions of the decomposition operation.

BRIEF DESCRIPTION OF THE DRAWINGS

The features and advantages of the method and apparatus for decomposing organic halogen-containing compounds according to the present invention will be more clearly understood from the following description of the preferred embodiments of the present invention taken in conjunction with the accompanying drawings in which identical reference numerals designate the same or similar elements or sections throughout the figures thereof and in which:

FIG. 6 is a graphic representation showing the relationship between the decomposition ratio and the reaction time with use of another sensitizer.

DETAILED DESCRIPTION OF THE PREFERRED EMBODIMENTS

Figure 1:
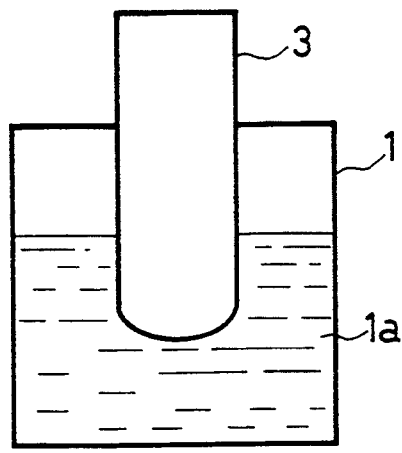
FIG. 1 is a schematic illustration of an exemplary configuration of an apparatus for performing the method of decomposing organic halogen-containing compounds according to the present invention.

First, the basic principle of the method of decomposing organic halogen-containing compounds according to the present invention will be outlined.

When an organic halogen-containing compound is dissolved in a solvent and exposed to ultraviolet radiation, the carbon-halogen bond can be weakened by solvation effect of the solvent molecules. Therefore, the carbon-halogen bond in the liquid phase can be broken by radiation of a low energy level, in comparison with that in the gaseous phase. The halogen element which was disconnected from the carbon atom is considered as existing in the form of halogen ion. The content of the halogen ion increases in accordance with the progress of the decomposition reaction, therefore the reaction solution is acidified. However, this result does not adversely affect the decomposition reaction.

If an alkaline material such as an alkaline metal and the like is present in the liquid phase reaction system, the alkaline material and the free halogen ion which was disconnected from the halogen-containing compound form a salt, which is precipitated and removed from the reaction system. However, if an alcohol is used as a solvent here, part of the alcohol molecules are transferred to the corresponding aldehyde or ketone molecules by ultraviolet radiation, and the aldehyde, ketone and the like in the presence of alkaline material react in accordance with the aldol condensation reaction. This condensation reaction hinders progress of the decomposition reaction of the halogen-containing compounds. As a result, the decomposition reaction of the halogen-containing compounds may not be completely accomplished, and part of the halogen-containing compounds remains unreacted. Moreover, if the liquid part is recovered and used again for the decomposition operation of another portion of the halogen-containing compound, the decomposition efficiency is remarkably reduced. Namely, it is impossible to recycle the reaction system while maintaining a satisfactory decomposition efficiency, which results in an economical disadvantage.

The present invention has been accomplished in view of the above-mentioned defects, and the decomposition method of the present invention is characterized by: exposing to ultraviolet rays the liquid containing the halogen-containing compound and a solvent in the substantial absence of alkaline material; and comprising the step of treating the liquid phase with a necessary amount of an alkaline material, separately from the above irradiation step. By removing the alkaline material from the irradiation step, the halogen-containing compound in the reaction system can be introduced into the initial decomposition reaction substantially whole or at a higher ratio than that at the reaction in the presence of an alkaline material. Namely, the decomposition method according to the present invention comprises: introducing the halogen-containing compound into a solvent containing substantially no alkaline material to form a liquid phase, and irradiating ultraviolet rays on the liquid phase; and treating the liquid phase with a predetermined amount of an alkaline material.

It has been found by the research of the present inventors that the alkali treatment step of the present invention does not only work for removing the halogen element from the reaction system by salt formation, but also has the function which is described below.

If Freon CFC-11 (fluorotrichlorocarbon), for example, is decomposed, the initial reaction step $\alpha$ of the reaction process which is shown by the following formula is completed by the ultraviolet irradiation, and the first of the four halogen atoms is removed. However, it is rather difficult to proceed with the subsequent reaction steps $\beta$ to $\delta$ in which the remaining halogen elements are removed, but, if an alkaline material is added to the solution after the irradiation by ultraviolet light, the reaction can easily advance to the subsequent steps $\beta$ to $\delta$. In other words, the decomposition reaction also progresses in the alkaline treatment step in the present invention. In contrast, if the irradiation is carried out in the presence of the alkaline material, reaction of the second step $\beta$ can be positively detected. However, the reaction of the first step $\alpha$ cannot be fully accomplished, and part of the initial halogen-containing compound remains.

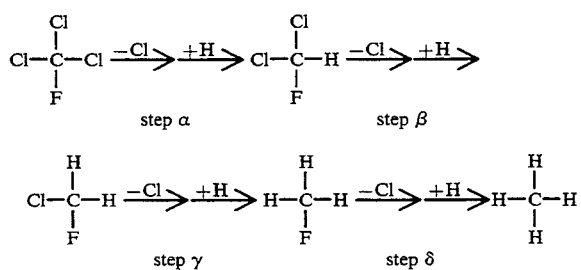

Consequently, according to the present invention, the initial reaction step $\alpha$ can be fully accomplished by separating the ultraviolet irradiation treatment from the alkali treatment, and the subsequent reaction steps can also be easily carried out. Therefore, results of the decomposition reaction in the present invention are better than in the conventional decomposition techniques.

Moreover, from the above description, it can be clearly understood that if the initial halogen-containing compound to be decomposed is a substance such as Freon HCFC-21 (dichlorofluorohydrocarbon) and the like, the ultraviolet radiation step is unnecessary for the decomposition operation. As an example of such a fluorine-containing compound that requires no radiation step for decomposition, Freon HCFC-31 (chlorodihydrofluorocarbon), HCFC-22($CHClF_2$), CFC-12($CCl_2F_2$) and the like can be given.

In addition, as an advantageous feature resulting from the absence of the alkaline material at the radiation step, it can be illustrated that decrease of the decomposition efficiency can be minimized satisfactorily when the decomposition operation is repeated by using the solvent recovered from the reaction system which has been once used for the decomposition operation. Therefore, the decomposition operation of the present invention can be similarly repeated with a high decomposition efficiency by adding the steps of separating the precipitated salt and of mixing another portion of the halogen-containing compound after the alkali treatment step. The decomposition method of the present invention can also be set up as a continuous flow operation system. As a result, the decomposition method according to the present invention is greatly advantageous in economy and practicality.

In view of the recycling use of the reaction system, it is preferred to appropriately regulate the amount of alkaline material to be added at the alkali treatment step in accordance with degree of progress of the decomposition reaction at the ultraviolet irradiation step so that excessive alkaline material does not remain in the liquid phase after the alkali treatment. If the decomposition reaction at the irradiation step proceeds at a 100% ratio, the alkaline material is added in an amount required to neutralize the halogen atoms contained in the halogen-containing compound. As described above, if the reaction liquid is mixed with an appropriate amount of alkaline material so that almost no alkaline material remains in the liquid phase after the alkali treatment, the liquid can be repeatedly used for another cycle of the decomposition operation by adding another portion of the halogen-containing compound.

From the above description, it should be understood that "the condition in which alkaline material is substantially absent in the liquid" equally means "the condition in which the above-described advantages can be obtained", and specifically, "the condition in which the concentration of the alkaline material contributing to convert the liquid to an alkaline state is less than or equal to 0.3 mol/l". More suitably, the concentration is regulated to a value less than 0.005 mol/l. Specifically, if the decomposition method of the present invention is repeated, only a slight amount of neutralized salt (NaCl, NAF, KCl, KF, etc.) may be contained in the liquid phase. In such a case, the concentration of the alkaline material can be regarded as being equal to (the concentration of total alkaline material in the liquid phase—the concentration of the alkaline material forming neutral salt)=the concentration of excess alkaline material.

The detailed conditions of the decomposition method according to the present invention will now be described.

First, the solvent for composing the liquid phase which contains the halogen-containing compound to be decomposed will be described. A solvent which can dissolve the halogen-containing compound to be decomposed can be used in the present invention. Such a solvent can loosen the halogen-carbon bond of the halogen-containing compound with a solvation effect, thereby dehalogenation of the halogen-containing compound can easily proceed. In those solvents, alcoholic solvents are especially preferred, because an alcoholic solvent can donate a proton to the dehalogenated compound, and this feature can support the decomposition reactivity. Moreover, in the alcoholic solvent, the halogen eliminated from the halogen-containing compound can stably exist in the form of a halogen ion. In addition, when an alkaline material containing an alkaline metal is used in the alkali treatment, the alcoholic solvent can form an alcoholate compound with the alkaline material. The alcoholic solvents are also advantageous in availability and handling ease in industry. If a mixture of plural solvents can dissolve the halogen-containing compound, such a mixture can, of course, be suitably used in the present invention. As examples of the preferred alcoholic solvent, methanol, ethanol, n-propanol, isopropanol and the like can be given. For selecting the most preferable solvent, the inventors of the present invention reason as follows.

1) In the decomposition reaction of a halogen-containing compound, a hydrogen atom which is bonded to the carbon atom coupled to the hydroxy radical —OH of the alcohol molecule seems to work for advancing the dehalogenation and hydrogenation of the halogen-containing compound to be decomposed. Accordingly, an alcoholic solvent having such a hydrogen atom with high activity is suitable.

2) If the above-described carbon atom has an electron donative substituent, the above-described hydrogen atom has increased reactivity. Therefore, the carbon atom having an electron donative radical is preferred.

3) Since the halogen-containing compound reacts with the alcohol molecule in accordance with radical reaction, the above-described electron donative substituent with less steric hindrance is preferred so as not to lessen the reactivity in the radical reaction. In view of the above, a methyl radical is preferable for the electron donative substituent.

4) The reactivity of the hydrogen atom increases as the number of the electron donative radicals increases. Therefore, an alcohol molecule in which the carbon atom has two electron donative radicals is preferable.

From the above consideration, isopropanol can be regarded as being the most suitable solvent for the decomposition method of the present invention.

The halogen-containing compound is preferably introduced into the solvent in an amount of less than or equal to one tenth by mole ratio relative to the solvent. A more suitable amount of halogen-containing compound is less than or equal to one thirtieth. If the amount of halogen-containing compound exceeds the above preferable range, it becomes difficult to complete the decomposition reaction.

In the above-described decomposition reaction without alkaline material by ultraviolet radiation, it is possible to substantially decompose the entire amount of the initial halogen-containing compound. However, a rather high level of radiation energy is required. Specifically, far ultraviolet rays, i.e. rays with a wavelength not more than 300 nm, are preferred. For example, if ultraviolet rays of 254 nm are used in the ultraviolet irradiation step, irradiation of 10 to 30 minutes can diminish the initial halogen-containing compound to a non-detectable level. If the wavelength of the radiation used is long, the velocity of the decomposition reaction is remarkably reduced. Here, it should be noted that, if a sensitizer material is used in the irradiation step, radiation of a longer wavelength, for example, near ultraviolet rays of 400 to 300 nm, is also applicable. It is also possible to achieve the decomposition reaction at a decomposition efficiency of 100% by using radiation of a wavelength in the vicinity of 365 nm.

It is desirable to use a compound having a ketone structure and/or aldehyde structure, i.e. carbonyl compounds as the sensitizer material. Especially, use of acetone, ethylmethylketone or acetoaldehyde can remarkably increase the decomposition velocity. These sensitizer compounds enable decomposition by radiation of near ultraviolet rays of approximately 365 nm at high decomposition efficiency. Since the preferable amount of the sensitizer material changes in accordance with the type of sensitizer material, solvent, halogen-containing compound to be decomposed, and wavelength of the ultraviolet radiation, it is appropriately regulated as necessity arises. However, a sufficient effect is obtained at most an equimolar amount of the sensitizer material relative to the halogen-containing compound.

If radiation of a short wavelength is used for decomposition, this tends to cause a side reaction. Therefore, it is required to take some measures to prevent production of large amounts of sub-products. However, in the decomposition method of the present invention, the sensitizer material enables decomposition by radiation of a longer wavelength, and the side reaction can be easily prevented by use of the sensitizer material. Therefore, the halogen-containing compound can be efficiently decomposed.

For the alkaline material which is added to the liquid phase after the ultraviolet radiation step, an applicable material is one which can form a salt with the halogen or hydrogen halide produced by the decomposition reaction, so that the formed salt can be precipitated and separated from the liquid phase. In this connection, alkaline metals such as sodium, potassium and the like have suitable properties for the above application, and sodium is the most suitable element for the alkaline material in view of availability and cost. According to the above, the alkaline material preferably contains the alkaline metal element. For actual use, alkaline metal compounds such as hydroxides, alcoholates and the like are suitable.

In the alkali treatment step, the alkaline material can be applied in various forms, and, in particular, a solid material and an aqueous solution of an alkaline hydroxide, a powder and an alcoholic solution of an alcoholate and the like are suitable.

If the aqueous solution of the alkaline metal hydroxide is employed, it is desired to use a solution with as high a concentration as possible so that the salt product can be effectively precipitated and separated from the liquid phase. In actual operation, a hydroxide solution of about 15N is suitable, in view of operational safety. Here, it should be noted that, if isopropanol is used as a solvent, use of highly concentrated hydroxide solution is not required for separation of the salt. A detailed explanation will be given hereinafter.

The alkali treatment can be also effectively carried out in a manner wherein the reaction solution after the ultraviolet irradiation is mixed with a grained alkaline metal hydroxide and fully stirred. As a modification of the utilization of the solid alkaline metal hydroxide, another method can be illustrated in which the solid alkaline metal hydroxide is formed into a laminate structure and the reaction solution is passed through the laminate structure, whereby the halogen element can be removed.

In the subsequent reaction steps $\beta$ to $\delta$ described before, alcoholates of the alkaline metal exhibits higher reactivity than their hydroxides. The alcoholates can be used in the form of an alcoholic solution which is prepared by dissolving the alkaline:metal in the alcohol solvent. However, preparation of the alcoholic solution requires a large volume of alcohol solvent due to the low solubility of the alcoholate in the alcohol solvent. For the present invention, it is not necessary to add the alcoholate in the form of a solution. A dispersed liquid and a powder of the alcoholate are also usable. An alcoholate compound with an alkoxy group which differs from the alkoxy group of the solvent alcohol can also be used. In view of economical requirements and reactivity in the subsequent reaction steps, the alcoholate powder and dispersion liquid of the alcoholate can be most advantageously utilized.

According to the decomposition method of the present invention, the ultraviolet irradiation step and the alkali treatment step can be repeatedly performed with the same liquid phase reaction system. At this time, it should be noted that the alkaline material must be prevented from remaining in the liquid phase after separation of the salt which is precipitated by addition of the alkaline material. For this purpose, the amount of the alkaline material to be added is appropriately controlled in accordance with the progress of the decomposition reaction. Nevertheless, another possibility still remains that error of measurement may cause alkaline material to remain. For solving this problem, it is proposed that the decomposition method be provided with the step of cleaning the liquid phase after the alkali treatment step.

The alkaline material can be dissolved in water. Accordingly, if water is added to the liquid phase after the alkali treatment step, the remaining alkaline material is dissolved in the added water. Therefore, if the water added to the reaction solution and containing the remaining alkaline material can be again separated from the reaction solution, cleaning of the liquid phase is possible. As a result of research for realizing this cleaning treatment, an excellent method has been found by the present inventors. This method is characterized in that isopropanol is employed as the solvent which composes the liquid phase for the decomposition reaction system.

Ordinarily, isopropanol is soluble in water at any mixing ratio, as well as other alcohol materials. However, isopropanol has a unique characteristic in that, if the water contains an electrolytic material, the isopropanol separates from the water. Accordingly, if isopropanol is used as a solvent in the first stage of the decomposition method, the water added and mixed with the reaction solution after the ultraviolet irradiation step and the alkali treatment step may dissolve the precipitated salts (NaCl, NaF, etc.) and the remaining alkali material dissolved in the reaction solution. Namely, the electrolytic materials are contained in the water, and the water separates from the isopropanol phase. Accordingly, removal of the remaining alkali material can be accomplished by removing the water phase from the isopropanol phase, and cleaning of the isopropanol phase can be almost completely achieved by repeating the water washing a necessary number of times. The obtained isopropanol phase is cleaned so that it can be suitably used for repeating another cycle of the decomposition operation. If water previously containing electrolytic material is used for the cleaning treatment, the separation efficiency can be improved. For example, in the case of sodium chloride, an aqueous solution with a concentration of more than or equal to about 15 wt % gives a clear and speedy separation. Moreover, if the water is appropriately acidified before addition, the waste water after dissolving the remaining alkaline material can be neutralized, resulting in easy after-treatment of the waste water. It is also possible to add the cleaning water in advance of the ultraviolet irradiation step or the alkali treatment step, based on the fact that the presence of water in the reaction solution does not affect the decomposition reaction during the decomposition by irradiation. In this case, the salt produced by addition of the alkali material and the remaining alkali material can be quickly dissolved in the water, and the water dissolving the salt and the like separates from the isopropanol phase in a short time. Therefore, removal of the remaining alkali material can be efficiently achieved.

For performing the decomposition described above in practice, a decomposition apparatus as shown in FIG. 1 can be utilized. The decomposition apparatus basically comprises a decomposition vessel 1 which is equipped with a ultraviolet lamp 3.

Figure 2:
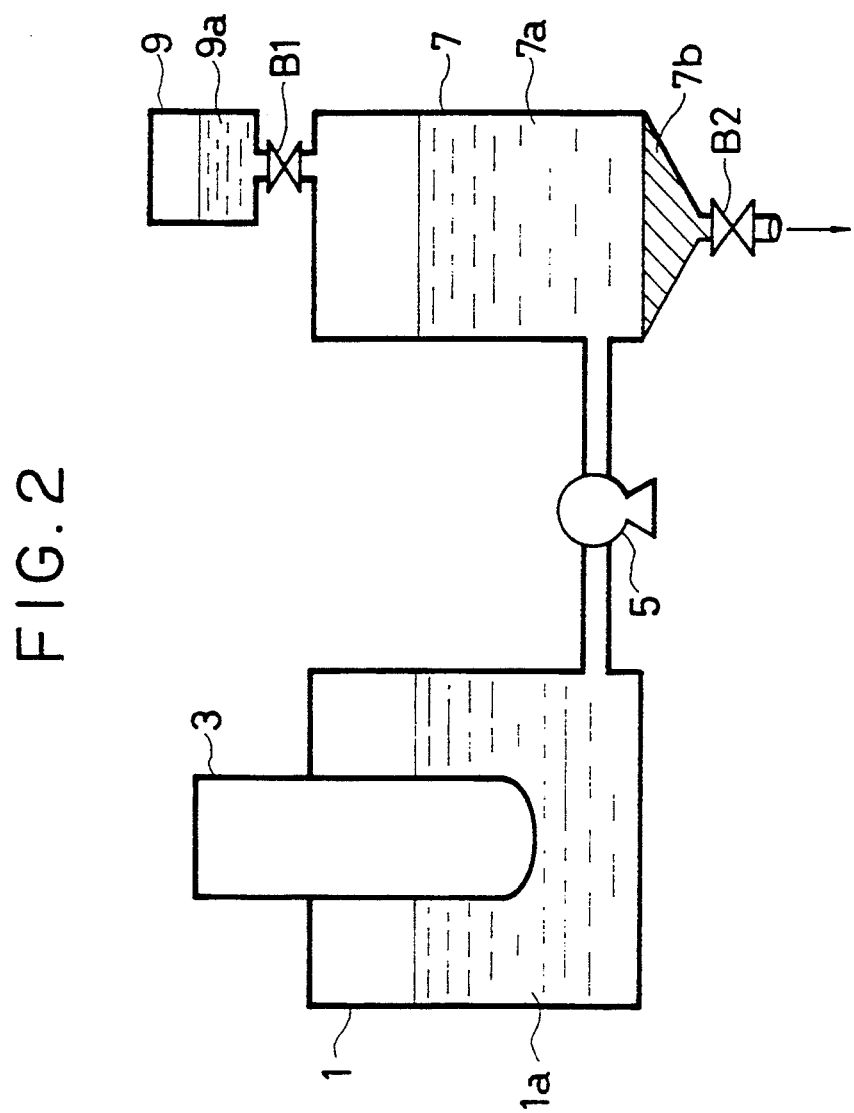
FIG. 2 is a schematic illlustration of another exemplary configuration of an apparatus for performing the method of decomposing organic halogen-containing compounds according to the present invention.

FIG. 2 shows an example of an improved decomposition apparatus whereby the decomposition operation can be continuously repeated. In the decomposition apparatus of FIG. 2, the decomposition vessel 1 is connected through a reversible pump 5 to an alkali treatment vessel 7. The pump 5 can transfer the fluid from one vessel to the other. A storage tank 9 with a valve B1 is fitted to the upper portion of the alkali treatment vessel 7, and the bottom portion of the alkali treatment vessel 7 is provided with a drain via a valve B2.

A solution of the halogen-containing compound to be decomposed is poured into the decomposition vessel 1 and irradiated with ultraviolet rays. After irradiation, the solution is transferred into the alkali treatment vessel 7 by the pump 5. A liquid containing an alkaline material is received in the storage tank 9, and the liquid is dropped into the alkali treatment vessel 7, with the valve B1 opened. The valve B1 is appropriately regulated so that the alkaline material is not excessively added. Addition of the alkaline material produces a salt 7b which is precipitated onto the bottom of the alkali treatment vessel 7. The precipitated salt 7b is removed from the vessel 7 by opening the valve B2. The remaining liquid 7a is fed back into the decomposition vessel 1. Then, the halogen-containing compound is added into the recovered liquid, and the above-described decomposition operations are repeated.

Figure 3:
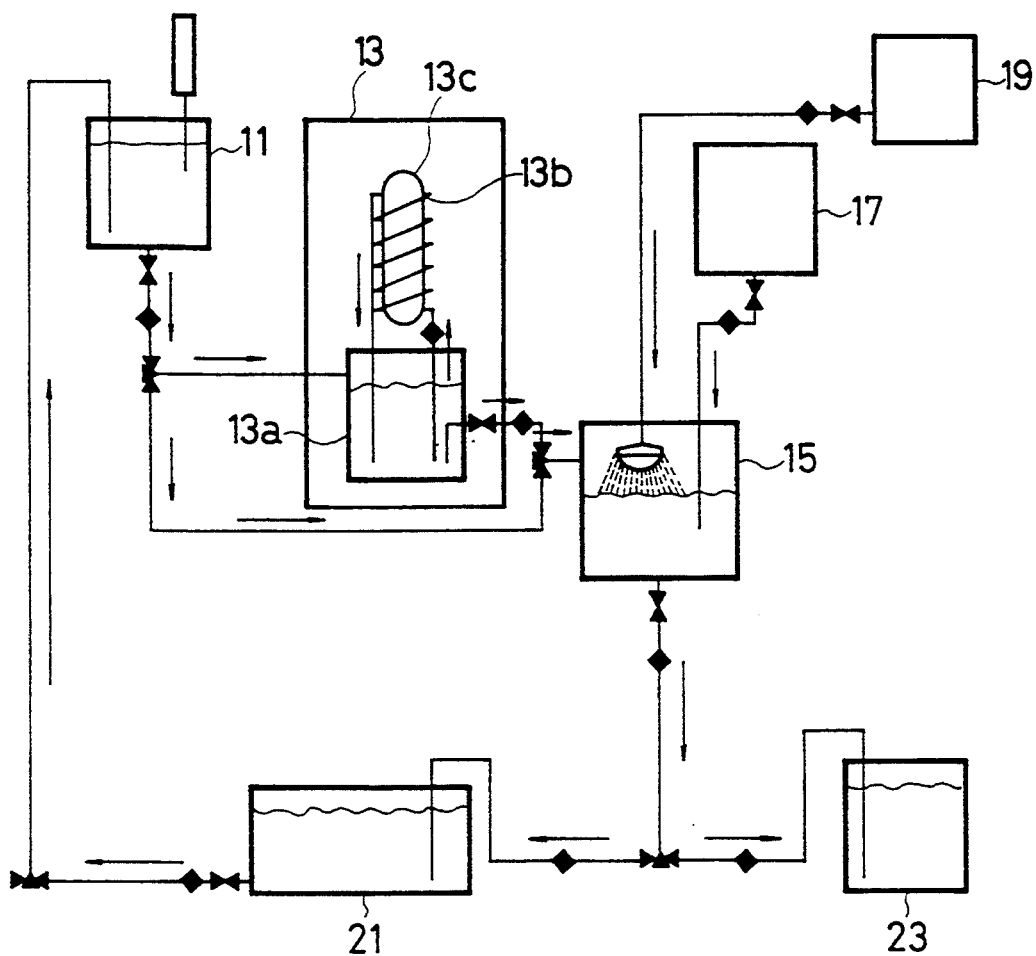
FIG. 3 is a schematic illustration of another exemplary configuration of an apparatus for performing the method of decomposing organic halogen-containing compounds according to the present invention.

FIG. 3 shows a decomposition apparatus used for an embodiment including cleaning treatment. In this apparatus, the halogen-containing compound and the solvent (isopropanol) are poured into a mixing tank 11 to prepare a mixed solution. The mixed solution is fed into a vessel 13a which is arranged in an ultraviolet irradiation chamber 13. The solution is then passed through a tube 13b wound around an ultraviolet lamp 13c, while the solution is irradiated. The solution after irradiation is fed into an alkali treatment vessel 15. A liquid containing the alkaline material or solid alkaline material is supplied from an alkali storage vessel 17 to the solution in the treatment vessel 15. Then, water is supplied from a water tank 19 and mixed with the solution. By this operation, the salt and the excessive alkaline material are dissolved in the water, and the mixture is separated into an aqueous phase and an isopropanol phase. These portions are separately discharged from the treatment vessel 15, so that the aqueous portion is drained from the treatment vessel 15 to a waste water tank 23, and the isopropanol portion is fed into the solvent tank 21. The recovered isopropanol portion is then fed back to the mixing tank 11 and recycled in the above-described decomposition process.

EXAMPLES

Referring now to the drawings and results of experiments, the preferred embodiments of the method and apparatus for decomposing halogen-containing compounds according to the present invention will be described.

1. Effect of Ultraviolet Irradiation with No Alkali

Experiment 1

As shown in FIG. 1, a decomposition apparatus was constructed by fitting an Ultraviolet lamp 3 (dominant wavelength: 254 nm, power: 200 W) to a decomposition vessel 5 made of glass and having a capacity of 1,000 ml. Into the decomposition vessel 1 was poured 500 ml of isopropanol solution which contained 15 ml (0.15 mole) of Freon CFC-11 as a halogen-containing compound. The concentration of the Freon CFC-11 in the solution was confirmed by gas chromatography, and the solution was then subjected to irradiation with the ultraviolet lamp 3 for ten minutes. After the irradiation, the concentration of the Freon CFC-11 was measured by gas chromatography, and the decomposition ratio of the Freon CFC-11 was calculated in accordance with the following equation.

Decomposition Ratio (%) =

$$\frac{\text{(Pre-irradiation Conc.} - \text{Post-irradiation Conc.)}}{\text{Pre-irradiation Conc.}} \times 100$$

Next, 100 ml of 15N sodium hydroxide aqueous solution was added to the irradiated solution, and the salt was then precipitated. The salt was filtered off, and the filtrate was mixed with 15 ml of Freon CFC-11 and 60 ml of isopropanol. Using the obtained mixture, the UV irradiation and the concentration measurements of the Freon CFC-11 of the second cycle were similarly carried out. As a result of the above, the decomposition ratio in the second cycle was 100%.

Figure 4:
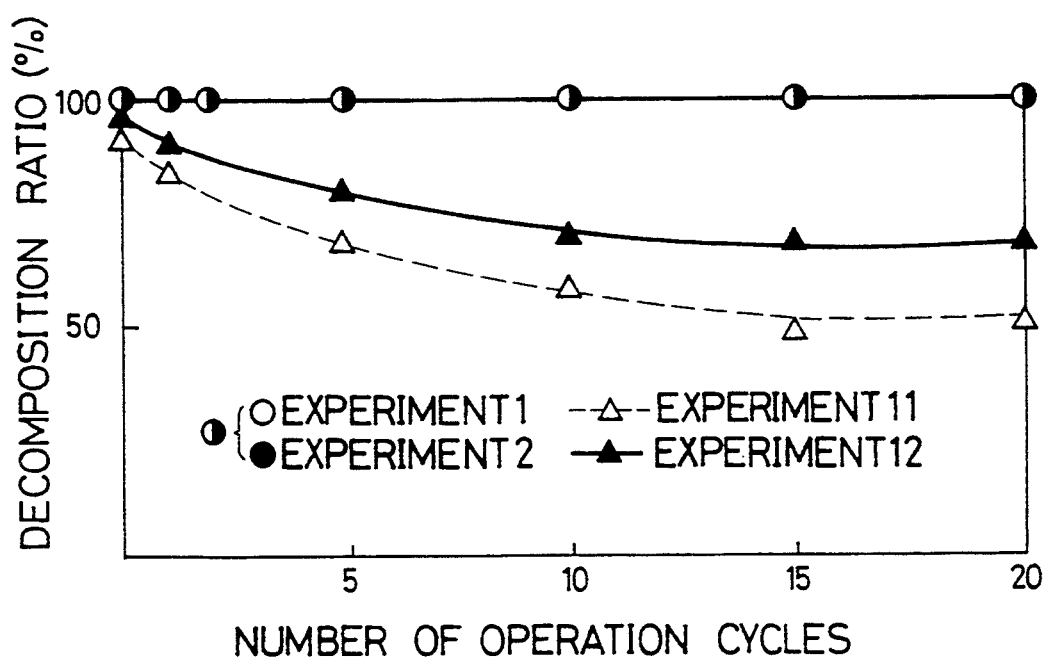
FIG. 4 is a graphic representation showing the relationship between the decomposition ratio of the halogen-containing compound and the number of decomposition operation cycles.

The above-described cyclic operation for decomposition was repeated twenty times, and the results are shown in FIG. 4. The decomposition ratio in the 20th cycle was also maintained at 100%.

Experiment 2

Using a decomposition apparatus which was constructed as shown in FIG. 2 comprising a decomposition vessel 1 with a capacity of 1,000 ml, 500 ml of isopropanol solution containing 15 ml of Freon CFC-11 was placed in the vessel 1, and the isopropanol solution was subjected to irradiation with the ultraviolet lamp 3 (dominant wavelength: 254 nm, power: 300 W) for ten minutes. Through this experiment, the pre-irradiation concentration and the post-irradiation concentration of the Freon CFC-11 were also measured by gas chromatography in the same manner as in Experiment 1. The obtained decomposition ratio was 100%.

The isopropanol solution after irradiation was transferred to the treatment vessel 7 by a pump 5, and 100 ml of 15N sodium hydroxide aqueous solution were supplied to the isopropanol solution from a storage tank 9. Salt was precipitated, and this was separated by using a plain sedimentation technique, and discharged from the vessel 7 through the drain. The remaining liquid was fed back to a decomposition vessel 1, and mixed with 15 ml of Freon CFC-11 and 60 ml of isopropanol. Using the obtained mixture, the UV irradiation and the concentration measurements of the Freon CFC-11 of the second cycle were similarly carried out. The decomposition ratio in the second cycle was 100%.

The above-described cyclic operations for decomposition were repeated twenty times, and the results are shown in FIG. 4. The decomposition ratio in the 20th cycle was 100%.

Experiments 3 through 10

In each of these cases, the procedure of Experiment 2 was repeated except that the halogen-containing compound to be decomposed was varied as indicated in Table 1, while the mole ratio of the halogen-containing compound to the used alkaline material was maintained. The values of the decomposition ratio in the first and twentieth cycles are also shown in Table 1.

TABLE 1

| Experiment | Halogen-Containing Compound | Decomposition Ratio cycle | |
|---|---|---|---|
| | | 1st (%) | 20th (%) |
| 1 | CFC-11 | 100 | 100 |
| 2 | CFC-11 | 100 | 100 |
| 3 | CFC-13 | 100 | 100 |
| 4 | CFC-113 | 100 | 100 |
| 5 | CFC-21 | 100 | 100 |
| 6 | trichloroethylene | 100 | 100 |
| 7 | tetrachloroethylene | 100 | 100 |
| 8 | monochlorobiphenyl | 100 | 95 |
| 9 | trichlorobiphenyl | 100 | 95 |
| 10 | pentachlorobiphenyl | 100 | 90 |

Experiment 11

The irradiation operation of the first cycle of Experiment 2 was repeated except that an isopropanol solution which contained 5 mol % of sodium isopropanolate was used as a solvent, and no alkaline aqueous solution was supplied from the storage tank 9. The decomposition ratio of the first irradiation operation was 90%. The precipitated salt in the alkali treatment vessel 7 was removed by the sedimentaton technique, and the remaining liquid was fed back into the decomposition vessel 1. The recovered liquid was mixed with 15 ml of Freon CFC-11 and 60 ml of isopropanol solution containing 5 mol % of sodium isopropanolate and subjected to the irradiation of the second cycle. The decomposition ratio of the second irradiation was 85%. Similarly, the cyclic operations were repeated up to the twentieth cycle, and the results are shown in FIG. 4. As the operation was repeated, the decomposition ratio was drastically reduced and reached 50% at the 20th irradiation. At this time, the reaction solution had become colored.

Experiment 12

The irradiation operation of the first cycle of Experiment 11 was repeated except that 500 ml of isopropanol solution which contains 45 ml of 15N sodium hydroxide aqueous solution was used, in spite of the isopropanol solution containing sodium isopropanolate. The decomposition ratio of the first irradiation operation was 95%. The precipitated salt was similarly removed, and the remaining liquid was fed back into the decomposition vessel 1. The recovered liquid was mixed with 15 ml of Freon CFC-11, 60 ml of the isopropanol solution and 45 ml of 15N sodium hydroxide aqueous solution and subjected to the irradiation of the second cycle. The decomposition ratio of the second irradiation was 90%. Similarly, the cyclic operations were repeated up to the twentieth cycle, and the results are shown in FIG. 4. As the operation was repeated, the decomposition ratio was reduced, and reached 70% at the 20th irradiation. At this time, the reaction solution had become slightly colored.

From the results of the above experiments, it is clearly understood that irradiation with no alkali gives a higher decomposition ratio than in the case where alkali is present. Moreover, elimination of alkali from the irradiation condition can prevent the decomposition ratio from falling in accordance with the repetition of the decomposition operations.

2. Effect of Sensitizer

Experiment 13

Figure 5:
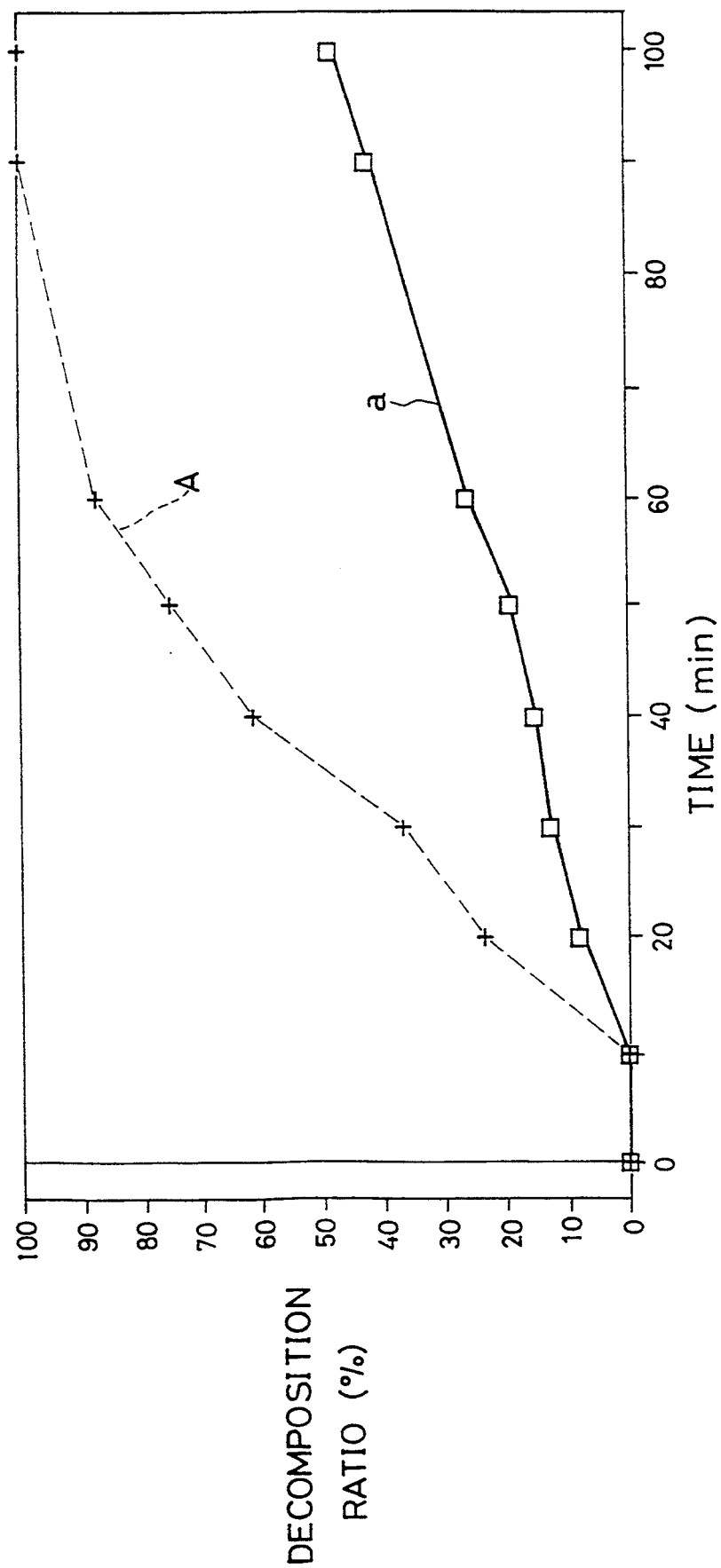
FIG. 5 is a graphic representation showing the relationship between the decomposition ratio and the reaction time with use of a sensitizer.

Using a decomposition apparatus which was constructed as shown in FIG. 1 comprising a decomposition vessel 1 with a capacity of 1,000 ml, 500 ml of methanol solution containing 3 vol % of Freon CFC-11 and 2 ml of acetone as a sensitizer were placed in the vessel 1 and intermixed. The mixture was subjected to irradiation with the ultraviolet lamp 3 (dominant wavelength: 254 nm, power: 32 W) for one hundred minutes. During the irradiation, measurement of the concentration of the Freon CFC-11 by gas chromatography was repeated to obtain a change in the decomposition ratio with time. The result is shown by the line A of FIG. 5. The decomposition ratio reached 100% from the one hundred-minute irradiation.

Experiment 14

The procedure of Experiment 13 was repeated except that no sensitizer material was used. Similarly, change of the decomposition ratio with time was obtained by the measurement of the concentration of Freon CFC-11. The result is shown by the line a of FIG. 5. The decomposition ratio reached 47% from the one hundred-minute irradiation.

Experiment 15

Using the decomposition apparatus of Experiment 13, 500 ml of isopropanol solution containing 3 vol % of Freon CFC-11 and 5 ml of acetone as a sensitizer were placed in the vessel 1 and intermixed. The dominant wavelength of the ultraviolet lamp 3 was changed to 365 nm, and the mixture was subjected to irradiation for twenty minutes. During the irradiation, measurement of the concentration of the Freon CFC-11 by gas chromatography was repeated to obtain a change in the decomposition ratio with time. The result is shown by the line B of FIG. 6. The decomposition ratio reached 100% from the twenty-minute irradiation.

Experiment 16

The procedure of Experiment 15 was repeated except that the sensitizer was changed to ethyl methyl ketone, and the amount of the sensitizer was a half by molar ratio of the Freon CFC-11. Similarly, change of the decomposition ratio with time was obtained by the measurement of the concentration of Freon CFC-11. The result is shown by the line C of FIG. 5. The decomposition ratio reached to 100% by the twenty-minute irradiation.

Experiment 17

The procedure of Experiment 16 was repeated except that the sensitizer was changed to acetaldehyde. Change of the decomposition ratio with time was obtained by a similar measurement to the above. The result is shown by the line D of FIG. 5. The decomposition ratio reached 100% from the twenty-minute irradiation.

Experiment 18

The procedure of Experiment 16 was repeated except that the sensitizer was changed to acetophenone. Change of the decomposition ratio with time was obtained by a similar measurement to the above. The result is shown by the line E of FIG. 5. The decomposition ratio reached 82% from the eighty-minute irradiation.

Experiment 19

The procedure of Experiment 16 was repeated except that the sensitizer was changed to benzophenone. Change of the decomposition ratio with time was obtained by a similar measurement to the above. The result is shown by the line F of FIG. 5. The decomposition ratio reached 73% from the eighty-minute irradiation.

Experiment 20

The procedure of Experiment 16 was repeated except that the sensitizer was changed to biacetyl. Change of the decomposition ratio with time was obtained by a similar measurement to the above. The result is shown by the line G of FIG. 5. The decomposition ratio reached 71% from the eighty-minute irradiation.

Experiment 21

With the decomposition apparatus of Experiment 13, 500 ml of isopropanol solution containing 3 vol % of Freon CFC-11 was placed in the vessel 1, and no sensitizer was employed. The dominant wavelength of the ultraviolet lamp 3 was changed to 365 nm, and the isopropanol solution was subjected to irradiation for three hours. However, the decomposition ratio obtained from measurement of the concentration of the Freon CFC-11 was 0% after the three-hour irradiation.

Experiment 22

Using a decomposition apparatus as shown in FIG. 2, 500 ml of methanol solution containing 3 vol % of Freon CFC-11 and 2 ml of acetone were placed in the vessel 1 and subjected to irradiation with the ultraviolet lamp 3 (dominant wavelength: 254 nm) for one hundred minutes. Through this experiment, the pre-irradiation concentration and the post-irradiation concentration of the Freon CFC-11 were similarly measured by gas chromatography. The decomposition ratio obtained from the results of the measurement was 100%.

Then, the pump 5 was operated to transfer the irradiated solution into the alkali treatment vessel 7. A 15N sodium hydroxide aqueous solution was received in the storage tank 9. With the valve B1 opened, the sodium hydroxide solution was supplied to the methanol solution, and the valve B1 was regulated so that the amount of added sodium hydroxide was four times by molar ratio of the Freon CFC-11. The precipitated salt was removed from the treatment vessel 7, with the valve B2 opened.

From the results of the above experiments, it can be easily understood that the velocity of the decomposition reaction can be raised by addition of the sensitizer. Moreover, use of the sensitizer enables decomposition by ultraviolet irradiation of a longer wavelength.

3. Effect of Water Washing Treatment

Experiment 23

Using a decomposition apparatus which was constructed as shown in FIG. 3, 500 ml of isopropanol was placed in the mixing tank 11. Then, Freon CFC-11 was added and dissolved in the isopropanol so that the concentration of the Freon CFC-11 was set at 2 vol %, and the solution was fed into the vessel 13a of the UV irradiation chamber 13. The UV lamp (power: 32 W) was radiated at a dominant wavelength of 254 nm for thirty minutes, while the isopropanol solution was circulated through the tube 13b. The irradiated solution was transferred to an alkal treatment vessel 15. Sodium methanolate of four-times the amount by molar ratio of the initial amount of the Freon CFC-11 was added from an alkali storage vessel 17 to this isopropanol solution. Then, 200 ml of water was added to the isopropanol solution, and the mixed solution was stirred for about two minutes. Then, the solution was left to stand for three minutes during which the mixed solution was separated into an isopropanol phase and an aqueous phase. The aqueous portion was drained from an alkali treatment vessel 19. The above-described water washing treatment was similarly repeated, until the drained aqueous portion approached to the neutral state. After the above process, the total Freon concentration (=conc. of organic fluorine-containing compounds≃conc. of CFC-11+HCFC-21+HCFC-31+fluoromethane) was measured by gas chromatography, and the decomposition ratio was similarly calculated from the pre-and post-irradiation values of the total Freon concentration, the result of which was 100%.

Using the recovered isopropanol, the above-described operation cycle of preparing CFC-11 solution, irradiating with UV rays, treating with alkali, and washing with water was repeated, and the decomposition ratio based on the total Freon concentration in each cycle was calculated. At the 25th cycle, the decomposition ratio based on the total Freon concentration was 97%.

Experiments 24 through 28

In each of these cases, the procedure of Experiment 23 was repeated except that the cleaning material used at the washing step was varied as indicated in Table 2. The values of decomposition ratio at the first and twenty fifth cycles were calculated based on the total Freon concentration, and the results are shown in Table 2.

TABLE 2

| Experiment | Cleaning Material Compound | Decomposition Ratio cycle 1st (%) | 25th (%) |
| --- | --- | --- | --- |
| 23 | water | 100 | 97 |
| 24 | NaCl aq. sol. (20 wt %) | 100 | 98 |
| 25 | KCl aq. sol. (25 wt %) | 100 | 95 |
| 26 | $Na_2SO_4$ aq. sol. (20 wt %) | 100 | 96 |
| 27 | $NaNO_3$ aq. sol. (25 wt %) | 100 | 96 |
| 28 | $CH_3COONa$ aq. sol. (30 wt %) | 100 | 98 |

Experiment 29

Using a decomposition apparatus which was constructed as shown in FIG. 3, 500 ml of isopropanol was placed in the mixing tank 11. Then, Freon CFC-11 was added and dissolved in the isopropanol so that the concentration of the Freon CFC-11 was 2 vol %. Moreover, 200 ml of water was added to the isopropanol solution, and this solution was fed into the vessel 13a of the UV irradiation chamber 13. The UV lamp (power: 32 W) was radiated at a dominant wavelength of 254 nm for thirty minutes, while the isopropanol solution was circulated through the tube 13b. The irradiated solution was transferred to the alkali treatment vessel 15. Sodium methanolate of four-times the amount by molar ratio of the initial amount of the Freon CFC-11 was added from the alkali storage vessel 17 to this isopropanol/water solution. After the above process, the solution was left to stand for two minutes, While the solution gradually separated into two phases. The Na concentration and the Cl concentration in the aqueous phase were measured, and the alkali removal ratio was calculated from the obtained concentration values in accordance with the following equation. As a result, the alkali removal ratio was 98.8%.

$$\text{Alkali Removal Ratio} = \frac{\text{Excess Alkaline in Aq. Phase}}{\text{Total Excess Alkali}}$$

$$= \frac{(\text{Na in Aq. Phase}) - (\text{Halogen in Aq. Phase})}{(\text{used Na}) - (\text{Halogen in Aq. Phase})}$$

Experiment 30

Using a decomposition apparatus which was constructed as shown in FIG. 3, 500 ml of isopropanol was placed in the mixing tank 11. Then, Freon CFC-11 was added and dissolved in the isopropanol so that the concentration of the Freon CFC-11 was 2 vol %. This isopropanol solution was fed into the vessel 13a of the UV irradiation chamber 13. The UV lamp (power: 32 W) was radiated at a dominant wavelength of 254 nm for thirty minutes, while the isopropanol solution was circulated through the tube 13b. The irradiated solution was transferred to the alkali treatment vessel 15. Sodium methanolate of four-times the amount by molar ratio of the initial amount of the Freon CFC-11 was added from the alkali storage vessel 17 to the isopropanol solution. Moreover, the isopropanol solution was mixed with 200 ml of water and stirred. Then, the solution was left to stand for two minutes, while the solution gradually separated into two phases. The Na concentration and the Cl concentration in the aqueous phase were measured, and the alkali removal ratio was similarly calculated from the obtained concentration values in accordance with the above equation. As a result, the alkali removal ratio was 75%.

Experiment 31

The procedure of Experiment 23 was repeated except that, instead of the water washing treatment with water, filtration treatment of precipitated salt was carried out after addition of the alkaline material. The decomposition ratio was calculated at each of the first and twelfth cycles based on the total Freon concentration. The results were 100% at the first cycle and 75% at the twelfth cycle, respectively.

As clearly understood from comparison of the results of Experiments 23 through 28 and Experiment 31, employment of the water washing treatment enables an almost perfect removal of the excessive alkali. This results in a high decomposition efficiency which can be maintained through several decomposition operation cycles. Moreover, from the result of Experiments 29 and 30, it can be found that, if the wash water is added to the reaction system in advance, e.g. before the irradiation, the operation time necessary for completion of the separation can be remarkably shortened. It is also understood that the wash water can be suitably added to the reaction system between the irradiation and the alkali treatment. The time to add the wash water merely affects the necessary time for operation. If a satisfactory time is taken for the separation, the efficiency of alkali removal can be, of course, maintained at 95% or more.

Here, it should be noted that, in spite of the result of Experiment 31, the water washing treatment must not be regarded as an essential part of the decomposition method according to the present invention for preventing the decomposition ratio from falling when the cycle of the decomposition operation is repeated. This point of view has been fully supported by the results of Experiments 1 through 10. In this connection, the inventors consider as follows.

Between the Experiments 1 through 10 and Experiment 31, an influential difference can be seen in power of the ultraviolet lamp used in the operation process. From this fact, it is considered that a small demerit caused by the slightly mingled alkaline material was amplified by the low power of the lamp and distinctively appeared as a deterioration of decomposition ratio in the Experiment 31. In another view, the above fact also demonstrates that it is highly important that no alkali be present at the irradiation treatment for economical advantages, e.g. high energy efficiency for decomposition operation, etc.

4. Work of Alkaline Material

Experiment 32

Using a decomposition apparatus which was constructed as shown in FIG. 3, 500 ml of isopropanol was placed in the mixing tank 11. Then, Freon CFC-11 was added and dissolved in the isopropanol so that the concentration of the Freon CFC-11 was 2 vol %, and the solution was fed into the vessel 13a of the UV irradiation chamber The UV lamp (power: 32 W) was radiated at a dominant wavelength of 254 nm for thirty minutes, while the isopropanol solution was circulated through the tube 13b. The irradiated solution was transferred to the alkali treatment vessel 15.

Next, metallic sodium of four-times the amount by molar ratio of the initial amount of the Freon CFC-11 was dissolved in a necessary amount of methanol to prepare an alcoholate solution. This alcoholate solution was poured into the alkali storage vessel 17 and supplied to the isopropanol solution in the alkali treatment vessel 15. After the above process, the total Freon concentration was measured by gas chromatography, and the decomposition ratio was similarly calculated based on the total Freon concentration, the result of which was 100%.

Experiments 33 through 39

In each of these case, the procedure of Experiment 32 was repeated except that, instead of the sodium methanolate solution, the alkaline metal and the solvent for preparing the alcoholate solution were varied as indicated in Table 3. The decomposition ratio in each case was calculated based on the total Freon concentration, and the results are shown in Table 3.

TABLE 3

| Experiment | Alcoholate | Decomposition Ratio (%) |
|---|---|---|
| 32 | Na/MeOH | 100 |

TABLE 3-continued

| Experiment | Alcoholate | Decomposition Ratio (%) |
|---|---|---|
| 33 | Na/EtOH | 100 |
| 34 | Na/PrOH | 100 |
| 35 | Na/iso-PrOH | 100 |
| 36 | K/MeOH | 100 |
| 37 | K/EtOH | 100 |
| 38 | K/PrOH | 100 |
| 39 | K/iso-PrOH | 100 |

Experiment 40

The procedure of Experiment 32 was repeated except that, instead of the sodium methanolate solution, 30 ml of 15N NaOH aqueous solution was used. The decomposition ratio was similarly calculated based on the total Freon concentration, and the obtained value was 65%.

Experiment 41

The procedure of Experiment 32 was repeated except that, instead of the sodium methanolate solution, the same molar amount of sodium ethanolate powder was used. The decomposition ratio was similarly calculated based on the total Freon concentration, and the obtained value was 100%.

Removing the precipitated salt, the isopropanol liquid was recovered. The recovered liquid was similarly used for decomposition of the Freon CFC-11, by repeating the operation cycle of preparing a CFC-11 solution, irradiating the CFC-11 solution and treating with sodium ethanolate powder. Similarly, the decomposition ratio of the fifth cycle was calculated, the result of which was 100%.

Experiment 42

The procedure of Experiment 41 was repeated except that, instead of the sodium ethanolate powder, the same amount by molar ratio of sodium methanolate powder was used. The decomposition ratio was similarly calculated at each operation cycle, based on the total Freon concentration. The obtained values of the decomposition ratio at the first and fifth cycles are shown in Table 4.

Experiment 43

The procedure of Experiment 41 was repeated except that, instead of the sodium ethanolate powder, an isopropanol solution containing the same amount by molar ratio of sodium isopropanolate was used. The decomposition ratio was similarly calculated at each operation cycle, based on the total Freon concentration. The obtained values of the decomposition ratio at the first and fifth cycles are shown in Table 4.

TABLE 4

| | Decomposition Ratio cycle | | Total Volume of Solvent cycle | |
|---|---|---|---|---|
| Experiment | 1st (%) | 5th (%) | 1st (L) | 5th (L) |
| 41 | 100 | 100 | 0.50 | 0.48 |
| 42 | 100 | 100 | 0.50 | 0.49 |
| 43 | 100 | 100 | 0.50 | 2.47 |

By comparison of the results of Experiments 1, 2 with Examples 32 through 40, it can be understood that the alkaline material has a share in the second or later steps $\beta$ to $\delta$ of the decomposition reaction, as described before. The results of Experiments 32 through 40 also demonstrate that alcoholate compounds are preferable for advancing the reaction process. The alcoholate compounds have high reactivity in either solution or powder form. However, application of the powdered alcoholate is desirable for efficiently using the solvent.

Finally, it must be understood that the invention is in no way limited to the above embodiments and that many modifications may be made to the above embodiments without departing from the scope of the invention as defined by the appended claims.

What is claimed is:

1. A method of decomposing an organic halogen-containing compound, comprising the steps of:
    (a) exposing a liquid containing the organic halogen-containing compound and a solvent, said solvent containing substantially no alkaline material in which the organic halogen-containing compound is dissolved, to ultraviolet radiation in the substantial absence of alkaline material; and
    (b) treating the liquid with an alkaline material.

2. The method of claim 1, wherein the solvent includes an alcohol.

3. The method of claim 2, wherein the alcohol is selected from the group consisting of methanol, ethanol, n-propanol and isopropanol.

4. The method of claim 1, wherein the ultraviolet radiation includes light with a wavelength within a range of 200 to 300 nm.

5. The method of claim 1, further comprising, after the exposure of step (a) and the treating step (b), the steps of:
    (c) recovering the solvent containing substantially no alkaline material; and
    (d) recycling said recovered solvent from step (c) to step (a).

6. The method of claim 5, wherein the treating step (b) includes the step of adding an appropriate amount of the alkaline material into the liquid so that the substantially entire amount of the added alkaline material forms salt which precipitates out of the liquid, and step (c) includes the step of:
    removing the precipitated salt from the liquid.

7. The method of claim 5, wherein step (c) includes cleaning the liquid after the treating step (b) with a cleaning material to remove the alkaline material from the liquid.

8. The method of claim 7, wherein the solvent includes isopropanol, and the cleaning material includes water.

9. The method of claim 1, wherein the liquid at the exposure step (a) further contains a sensitizer.

10. The method of claim 9, wherein the sensitizer includes a carbonyl compound.

11. The method of claim 10, wherein the carbonyl compound is selected from the group consisting of acetone, ethyl methyl ketone, acetaldehyde, acetophenone, benzophenone and biacetyl.

12. The method of claim 1, wherein the alkaline material contains an alkaline metal element.

13. The method of claim 12, wherein the alkaline metal element is selected from sodium and potassium.

14. The method of claim 1, wherein the alkaline material includes an alcoholate compound.

15. The method of claim 14, wherein the alcoholate compound is selected from the group consisting of sodium methanolate, sodium ethanolate, sodium n-propanolate, sodium isopropanolate, potassium methanolate, potassium ethanolate, potassium n-propanolate, and potassium isopropanolate.

16. A method of decomposing an organic halogen-containing compound, comprising the steps of:
    (a) exposing a liquid containing the organic halogen-containing compound and isopropanol containing substantially no alkaline material to ultraviolet radiation in the substantial absence of alkaline material;
    (b) treating the liquid with an alkaline material; and
    (c) treating the liquid of step (b) with an aqueous liquid.

17. A method of decomposing an organic halogen-containing compound, comprising the steps of:
    (a) exposing a liquid containing (i) the organic halogen-containing compound, (ii) a solvent containing substantially no alkaline material, and in which the organic halogen-containing compound is dissolved and (iii) a sensitizer, to ultraviolet radiation in the substantial absence of alkaline material; and
    (b) treating the liquid with an alkaline material.

18. A method of decomposing an organic halogen-containing compound, comprising the steps of:
    (a) exposing a liquid containing the organic halogen-containing compound and a solvent containing substantially no alkaline material, and in which the organic halogen-containing compound is dissolved, to ultraviolet radiation in the substantial absence of alkaline material; and
    (b) treating the liquid with an alcoholate compound.

19. A method of decomposing an organic halogen-containing compound, comprising the steps of:
    (a) preparing a liquid containing the organic halogen-containing compound and a solvent containing substantially no alkaline material, and in which the organic halogen-containing compound is dissolved;
    (b) exposing the liquid of step (a) to light radiation of an effective wavelength for initiating decomposition of the organic halogen-containing compound in the substantial absence of an alkaline material; and
    (c) treating the liquid with an alkaline material.

* * * * *